Patented Jan. 12, 1937

2,067,738

UNITED STATES PATENT OFFICE 2,067,738

METHOD OF TREATING CARBONACEOUS ELECTRODE-ELEMENTS

Masutaro Suzuki, Oji-ku, Tokyo, Japan, assignor to Asahi Denka Kogyo Kabushiki Kaisha, Tokyo, Japan, a corporation of Japan No Drawing. Application June 4, 1935, Serial No. 24,851. In Japan April 11, 1935

2 Claims. (Cl. 91—68)

This invention relates to a method of treating carbonaceous electrode-elements for use in electrolytic cells in which chlorine is liberated at the anodes during operation.

It is well recognized that chlorine is liberated at the anode when aqueous solutions of chlorine compounds, NaCl, KCl, HCl, etc., are electrolyzed, and that when graphite or other carbonaceous substance is used for such anodes, the electrolyte penetrates or enters into the pores of the anodes and is electrolyzed to liberate chlorine within the pores, and such chlorine facilitates collapse or crumbling of the electrodes. Nascent oxygen is also liberated within the pores and further facilitates the deterioration of graphite electrodes.

It is an object of this invention to provide a method of treating carbonaceous electrode-elements to secure carbonaceous electrodes which will not collapse or crumble when chlorine or oxygen is liberated at the electrodes during electrolytic operation.

Another object of this invention is to provide a method for preventing the material which fills the pores of the carbonaceous electrodes and prevents entrance of the electrolyte into the pores from flowing out even at a high temperature, say above 70° C.

A further object of this invention is to obtain carbonaceous electrode-elements extremely durable and of long useful life even when used in high-temperature electrolytic cells in which chlorine is liberated at the electrodes.

Other objects and advantages of the invention will be apparent from the following description setting out certain preferred methods by which the objects are achieved.

It is well known that chlorinated oils are used for the impregnation of carbonaceous electrode-elements to prevent the electrolyte from penetrating or entering into the pores of the electrode-elements. I have found, however, that, even when the materials, i. e., oils, fats or fatty acids, have been chlorinated before the impregnation as far as possible, say to nearly zero iodine value, the chlorinated material which fills the pores of the carbonaceous electrode is further chlorinated under the action of nascent chlorine liberated during the electrolytic operation at a high temperature, say above 70° C. and this super-chlorination takes place at such a high rate that the electrode-elements collapse or crumble and become of no use within several days. It is believed that this super-chlorination is not effected by polymerization because the materials are almost saturated with chlorine, but is effected by replacement of hydrogen atoms in the material with the nascent chlorine, since great quantities of HCl gas are evolved out of the electrode. Moreover, the rapid formation of HCl generates heat at a high rate, thus raising the temperature of the chlorinated material so that the latter is disintegrated.

My invention aims to prevent such super-chlorination from occuring at such a high rate that the electrode collapses or crumbles, but to cause the super-chlorination to take place at a very low rate whereby the filling materials are further hardened by this super-chlorination. For this purpose, according to my invention, I form in the surface portion of each pore of the carbonaceous electrode-element by a treatment with concentrated sulphuric acid, a protective layer of substances which does not flow at temperatures even as high as 100° C. and over, but is highly resistant to the eroding action of nascent chlorine. This substance has such a degree of porosity that the chlorinated material, which has a relatively high viscosity even above 70° C., cannot flow out of the pores of the electrode, but electrolyte of relatively low viscosity can enter into the pores through the protective layer at a very slow rate. The nascent chlorine of the electrolyte which has been liberated by electrolysis and entered into the pores, acts on the chlorinated material directly inside the protective layer and super-chlorinates the same at such a low rate of speed that the latter is further hardened while the electrode-element neither collapses nor crumbles. With this super-chlorination, HCl gas is of course produced, but the rate of production is so very low that it causes no collapsing or crumbling of the electrode. The protective layer is, of course, gradually disintegrated in the course of its life, but before the layer has been completely disintegrated, the gradual super-chlorination of the filling material inside the layer reaches to a substantial depth to form a substantial layer of super-chlorinated material, and this super-chlorinated material is far harder than the ordinary chlorinated resins, oils, fats or fatty acids, and no reaction occurs even with nascent chlorine. In this manner the useful life of carbonaceous electrode-elements for the high temperature bath is prolonged to three to five times that of carbonaceous electrode-elements impregnated with ordinary chlorinated material for the low temperature bath. With about 1 mm. thickness of the protective layer, the above-mentioned super-chlorination requires some three months to reach a substantial depth.

In carrying out this invention, carbonaceous electrode-elements, after being dried, are placed within an impregnating apparatus of well-known construction, which is hermetically closed and evacuated in order to remove air and other occluded gases from the electrode-elements therein.

To prepare the impregnating material chlorine gas is blown into oil, fat or fatty acid which is in the liquid state, until it is chlorinated near zero iodine value, or chlorinated as far as possible. After the chlorination treatment, the liquid is heated to a temperature of from 40 to 70 degrees centigrade in order to facilitate impregnation. As an alternative for or in addition to the heating, a suitable solvent may be added to the liquid. The liquid is then introduced into the impregnating apparatus in which the electrode-elements under treatment were placed as hereinbefore stated, and after the apparatus is hermetically closed its interior pressure is raised by pumping to about 6 to 7 atmospheres, and the necessary impregnation is well effected. The electrode-elements are then withdrawn from the apparatus, and are subjected to drying if a solvent was used as hereinbefore mentioned. This drying may be effected by heating the electrode-elements to a relatively low temperature above the boiling point of the solvent used. The electrode-elements are then immersed into concentrated sulphuric acid of above 60 degrees of Baumé's hydrometer, for example of about 66 degrees, and left for several days at low temperature or for several hours at elevated temperature.

By the above treatment, the surface portion of the chlorinated material which fills the pores of the electrode-elements are converted into a substance having a proper porosity as hereinbefore specified to form the protective layer. The material forming this layer is mainly carbon, in other words, the chlorinated material, which existed in the corresponding space, has been charred by the concentrated sulphuric acid, and the porosity of this charred material is formed by the exclusion of the atoms other than carbon. Any material adhering over the surface of the electrode-elements after the impregnation process, which is electrically non-conductive, is also charred by the concentrated sulphuric acid, and this charred material cannot be held on the surface of the electrode-elements and drops therefrom during the sulphuric-acid treatment.

According to the provisions of the patent statutes, I have explained the principle and mode of operation of this invention and have illustrated and described what I now consider to represent its best embodiment. However, I desire to have it understood that within the scope of the appended claims, the invention may be practiced otherwise than as specifically illustrated and described.

I claim as my invention:—

1. Method of treating a carbonaceous electrode-element, comprising chlorinating to the maximum extent a material selected from the class consisting of oil, fat and fatty acid, impregnating said carbonaceous electrode-element with the chlorinated material thus prepared, and treating the impregnated electrode-element with concentrated sulphuric acid to convert only the surface portion of the chlorinated material in the pores of said electrode element into a substance consisting mainly of carbon having suitable porosity.

2. Method of treating a carbonaceous electrode-element, comprising chlorinating to the maximum extent a material selected from the class consisting of oil, fat and fatty acid, impregnating said carbonaceous electrode-element with the chlorinated material thus prepared and immersing the impregnated electrode-element into concentrated sulphuric acid of above 60 degrees of Baumé's hydrometer to clear only the surface portion of the chlorinated material in the pores of said electrode element.

MASUTARO SUZUKI.